US008260751B2

(12) United States Patent
Johnson et al.

(10) Patent No.: US 8,260,751 B2
(45) Date of Patent: Sep. 4, 2012

(54) LOG FILE TIME SEQUENCE STAMPING

(75) Inventors: William D. Johnson, Allen, TX (US);
Darel R. Stokes, Allen, TX (US); David G. North, Plano, TX (US); Robert Yellin, Austin, TX (US)

(73) Assignee: TDI Technologies, Inc., Plano, TX (US)

( * ) Notice: Subject to any disclaimer, the term of this patent is extended or adjusted under 35 U.S.C. 154(b) by 584 days.

(21) Appl. No.: 12/190,247

(22) Filed: Aug. 12, 2008

(65) Prior Publication Data

US 2010/0042632 A1 Feb. 18, 2010

(51) Int. Cl.
*G06F 17/30* (2006.01)

(52) U.S. Cl. .................................. 707/649; 707/672

(58) Field of Classification Search ................... 707/649
See application file for complete search history.

(56) References Cited

U.S. PATENT DOCUMENTS

| | | | | |
|---|---|---|---|---|
| 5,740,432 A | 4/1998 | Mastors | ........................ | 395/618 |
| 5,819,094 A | 10/1998 | Sato et al. | ...................... | 395/704 |
| 5,832,518 A | 11/1998 | Mastors | ........................ | 707/202 |
| 6,092,087 A | 7/2000 | Mastors | ........................ | 707/202 |
| 6,243,838 B1 | 6/2001 | Liu et al. | ........................ | 714/57 |
| 6,289,379 B1 | 9/2001 | Urano et al. | ...................... | 709/223 |
| 6,304,904 B1* | 10/2001 | Sathyanarayan et al. | ...... | 709/224 |
| 6,434,616 B2 | 8/2002 | Urano et al. | ................... | 709/224 |
| 6,505,245 B1* | 1/2003 | North et al. | .................... | 709/223 |
| 7,133,964 B2* | 11/2006 | Rodrigues et al. | ............ | 711/114 |
| 7,535,850 B2* | 5/2009 | Makowski et al. | ............ | 370/249 |
| 2002/0162017 A1 | 10/2002 | Sorkin et al. | ................... | 713/201 |
| 2002/0184366 A1 | 12/2002 | Kimoto et al. | ................. | 709/224 |
| 2003/0225982 A1* | 12/2003 | Fujita et al. | .................... | 711/148 |
| 2004/0230623 A1* | 11/2004 | D'Angelo et al. | ............ | 707/202 |
| 2005/0138483 A1 | 6/2005 | Hatonen et al. | ................. | 714/45 |
| 2005/0154977 A1 | 7/2005 | Abigail | .......................... | 715/513 |
| 2005/0246552 A1 | 11/2005 | Bade | ................................ | 713/193 |
| 2005/0267919 A1* | 12/2005 | Pivar et al. | ..................... | 707/203 |
| 2006/0040711 A1 | 2/2006 | Whistler | .......................... | 455/566 |
| 2006/0184498 A1 | 8/2006 | Meyer et al. | ........................ | 707/1 |
| 2006/0218204 A1 | 9/2006 | Ofer et al. | ....................... | 707/201 |
| 2006/0245625 A1 | 11/2006 | Tichelaar | ........................ | 382/124 |
| 2006/0248165 A1* | 11/2006 | Sridhar et al. | ................. | 709/218 |
| 2006/0270398 A1* | 11/2006 | Nakamura et al. | ............ | 455/423 |
| 2007/0156698 A1 | 7/2007 | Gebhart et al. | .................. | 707/10 |
| 2007/0266433 A1 | 11/2007 | Moore | ............................. | 726/15 |
| 2007/0282921 A1 | 12/2007 | Atluri et al. | ..................... | 707/202 |
| 2007/0283194 A1 | 12/2007 | Villella et al. | ................... | 714/57 |
| 2008/0013546 A1* | 1/2008 | Bhatt et al. | ................ | 370/395.52 |
| 2009/0271448 A1* | 10/2009 | Chen et al. | ..................... | 707/202 |
| 2010/0023797 A1* | 1/2010 | Atluri et al. | ........................ | 714/2 |
| 2010/0125316 A1* | 5/2010 | Marnfeldt et al. | ............... | 607/60 |

OTHER PUBLICATIONS

PCT Notification of Transmittal of the International Search Report and the Written Opinion of the International Searching Authority, or the Declaration mailed May 19, 2009 regarding PCT/US09/38919 filed Mar. 31, 2009.
Johnson et al., *System and Method for Monitoring and Securing a Baseboard Management Controller*, U.S. Appl. No. 12/102,605, filed Apr. 14, 2008.
Johnson et al., *Using Metadata Analysis for Monitoring, Alerting, and Remediation*, U.S. Appl. No. 12/134,642, filed Jun. 6, 2008.

* cited by examiner

*Primary Examiner* — Binh V Ho
(74) *Attorney, Agent, or Firm* — Baker Botts L.L.P.

(57) ABSTRACT

In certain embodiments, a method for log file time sequence stamping is provided. The method includes connecting to a console port of one or more data sources and receiving data from the data sources. The data may be logged with both an independent time stamp and a sequence indicator. The independent time stamp provides a consistent time stamp of when the data was received at the system and the time sequence indicator represents an order in which the data was received at the system.

18 Claims, 7 Drawing Sheets

| | 202 | 204 | 206 | 208 | 200 |
|---|---|---|---|---|---|
| | INDEPENDENT TIME | SEQUENCE NUMBER | SYSTEM | DATA | |
| 210 | 10:23:01 | 1 | SERVER1 | 21:32:51 LOGIN REQUEST: USERNAME: ADMIN PASSWORD: CAX1348Y | |
| 212 | 10:23:01 | 2 | FIREWALL | 15:23:46 INTRUSION ATTEMPT FROM 134.146.72.81 | |
| 214 | 10:23:01 | 3 | ROUTER | 19:15:32 UNABLE TO ACCESS 255.255.1.2 | |
| 216 | 10:23:01 | 4 | FIREWALL | 15:23:46 INTRUSION ATTEMPT FROM 142.167.85.214 | |
| 218 | 10:23:01 | 5 | SERVER1 | 21:32:51 USERNAME / PASSWORD VERIFIED | |
| 220 | 10:23:02 | 1 | SERVER1 | 21:32:52 ADMIN LOGGED IN | |
| 222 | 10:23:02 | 2 | ROUTER | 19:15:33 PING 255.255.1.2 | |
| 224 | 10:23:02 | 3 | SERVER1 | 21:33:02 STARTING PROCESS USER UPDATE | |
| 226 | 11:34:31 | 1 | SERVER1 | 22:34:21 ADMIN LOGOUT | |
| 228 | 11:34:31 | 2 | SERVER1 | 22:34:21 IDLE | |
| 230 | 11:34:31 | 3 | FIREWALL | 16:35:16 TRAFFIC ALLOWED FROM 178.216.15.72 | |

| INDEPENDENT TIME | SEQUENCE NUMBER | SYSTEM | DATA |
|---|---|---|---|
| 10:23:01 | 1 | SERVER1 | 21:32:51 LOGIN REQUEST: USERNAME: ADMIN PASSWORD: CAX1348Y |
| 10:23:01 | 2 | FIREWALL | 15:23:46 INTRUSION ATTEMPT FROM 134.146.72.81 |
| 10:23:01 | 3 | ROUTER | 19:15:32 UNABLE TO ACCESS 255.255.1.2 |
| 10:23:01 | 4 | FIREWALL | 15:23:46 INTRUSION ATTEMPT FROM 142.167.85.214 |
| 10:23:01 | 5 | SERVER1 | 21:32:51 USERNAME / PASSWORD VERIFIED |
| 10:23:02 | 1 | SERVER1 | 21:32:52 ADMIN LOGGED IN |
| 10:23:02 | 2 | ROUTER | 19:15:33 PING 255.255.1.2 |
| 10:23:02 | 3 | SERVER1 | 21:33:02 STARTING PROCESS USER UPDATE |
| 11:34:31 | 1 | SERVER1 | 22:34:21 ADMIN LOGOUT |
| 11:34:31 | 2 | SERVER1 | 22:34:21 IDLE |
| 11:34:31 | 3 | FIREWALL | 16:35:16 TRAFFIC ALLOWED FROM 178.216.15.72 |

*FIG. 2A*

| INDEPENDENT TIME (232) | SEQUENCE NUMBER (234) | DATA (236) | |
|---|---|---|---|
| 10:23:01 | 1 | 21:32:51 | LOGIN REQUEST: USERNAME: ADMIN PASSWORD: CAX1348Y |
| 10:23:01 | 5 | 21:32:51 | USERNAME / PASSWORD VERIFIED |
| 10:23:02 | 1 | 21:32:52 | ADMIN LOGGED IN |
| 10:23:02 | 3 | 21:33:02 | STARTING PROCESS USER UPDATE |
| 11:34:31 | 1 | 22:34:21 | ADMIN LOGGED OUT |
| 11:34:31 | 2 | 22:34:21 | IDLE |

SERVER1

*FIG. 2B*

| INDEPENDENT TIME (232) | SEQUENCE NUMBER (234) | DATA (236) | |
|---|---|---|---|
| 10:23:01 | 2 | 15:23:46 | INTRUSION ATTEMPT FROM 134.146.72.81 |
| 10:23:01 | 4 | 15:23:46 | INTRUSION ATTEMPT FROM 142.167.85.214 |
| 11:34:31 | 3 | 16:35:16 | TRAFFIC ALLOWED FROM 178.216.15.72 |

FIREWALL

*FIG. 2C*

| INDEPENDENT TIME (232) | SEQUENCE NUMBER (234) | DATA (236) | |
|---|---|---|---|
| 10:23:01 | 3 | 19:15:32 | UNABLE TO ACCESS 255.255.1.2 |
| 10:23:02 | 2 | 19:15:33 | PING 255.255.1.2 |

ROUTER

*FIG. 2D*

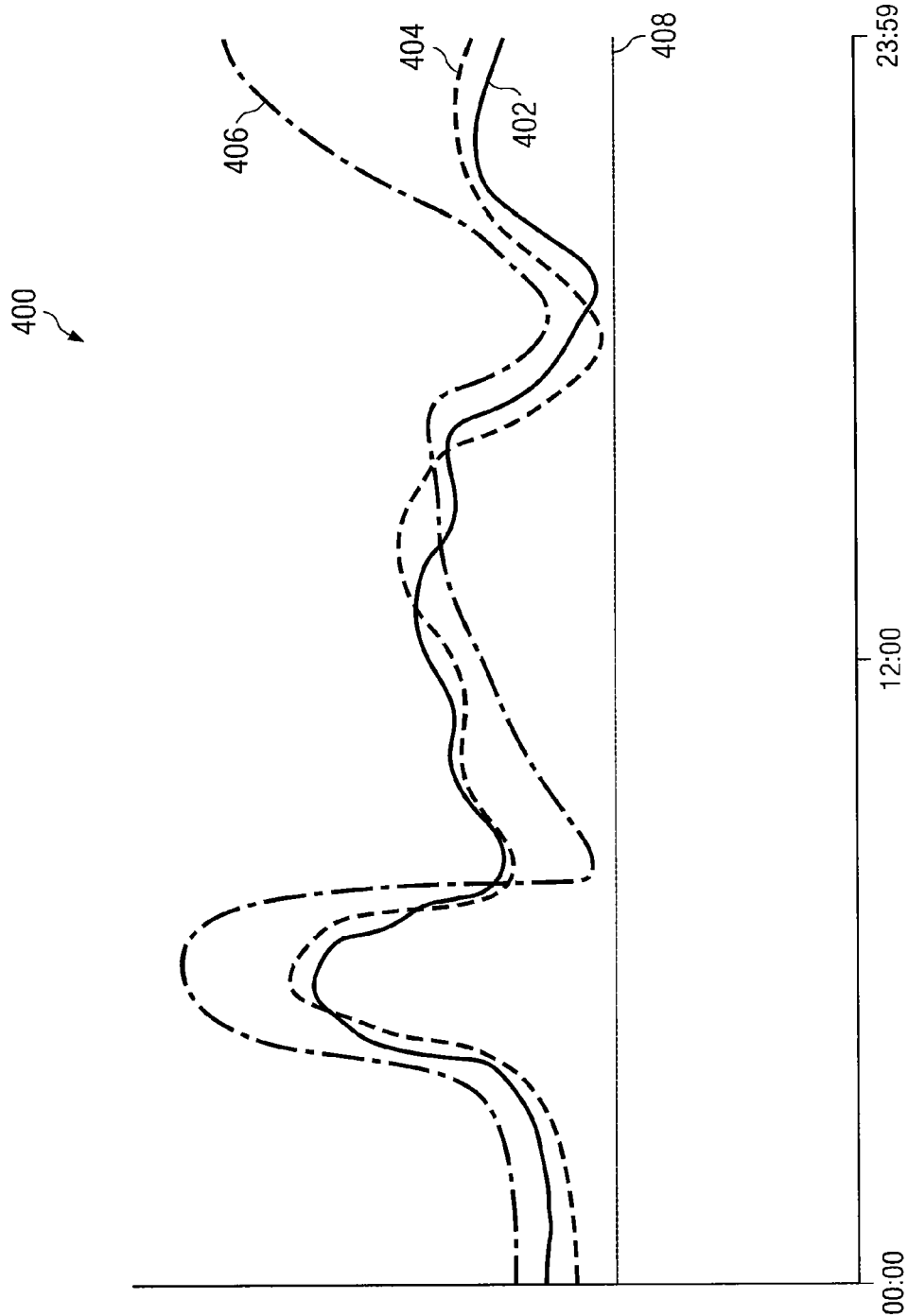

LOG FILE TIME SEQUENCE STAMPING

TECHNICAL FIELD

The present invention relates generally to data management, and more particularly to log file time sequence stamping.

BACKGROUND

Information technology managers often must monitor and manage an information technology architecture consisting of a large number of systems for failures, security breaches, and network utilization. Often these systems generate a large amount of data that is stored in log files that can be used to reconstruct the mode of failure, how a security breach occurred, or the historical performance of the systems. Many systems may send the data simultaneously to a monitoring system.

Information in the data often includes the local time and date that is on the system that sent the data with accompanying information, such as a particular user has logged in, a security event has been detected, or failures are occurring in a subcomponent of the system. The data may be sent from the systems using various types of network protocols including transmission control protocol/internet protocol (TCP/IP), syslog, asynchronous transfer mode (ATM), or user datagram protocol (UDP). Further the data could be received at the monitoring system through wired or wireless network connections.

SUMMARY

In certain embodiments, a method for log file time sequence stamping is provided. The method includes connecting to a console port of one or more data sources and receiving data from the data sources. The data may be logged with both an independent time stamp and a sequence indicator. The independent time stamp provides a consistent time stamp of when the data was received at the system and the time sequence indicator represents an order in which the data was received at the system.

In certain embodiments, a system for log file time sequence stamping is provided. The system includes one or more processing units operable to connect to a console port of one or more data sources and receive data those data sources. The system may be able to log the received data with both an independent time stamp and a sequence indicator. The independent time stamp provides a consistent time stamp of when the data was received at the system and the time sequence indicator represents an order in which the data was received at the system.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which:

FIG. 2A is a table illustrating an example log file generated by the system of FIG. 1;

FIGS. 2B, 2C, and 2D, are tables illustrating example system log files generated by the system of FIG. 1;

FIG. 4A is a graph illustrating example metadata fingerprints generated by the logging system of FIG. 1;

DETAILED DESCRIPTION OF EXAMPLE EMBODIMENTS

A particular issue in analyzing causes of failure or recreating the events that lead up to a particular issue with a data source or system is understanding the order of events that led up to the particular issue with a data source or system. Thus, the order in which data is received from each data source may be important. Logging systems often store data from these data sources and systems. The data may be logged according to the data source from which it originated. The data may also contain information regarding the local time on the data source that may or may not be reflective of the actual time. Additionally, because data sources can exist in different time zones, the local time, even if it correctly reflects the local time at the data source, may not provide a consistent measure of when data was actually sent or when the data was received by the logging system. Therefore, having a consistent measure of the order in which data was received may be crucial in properly recreating the events that led up to a system failure.

Figure 1:
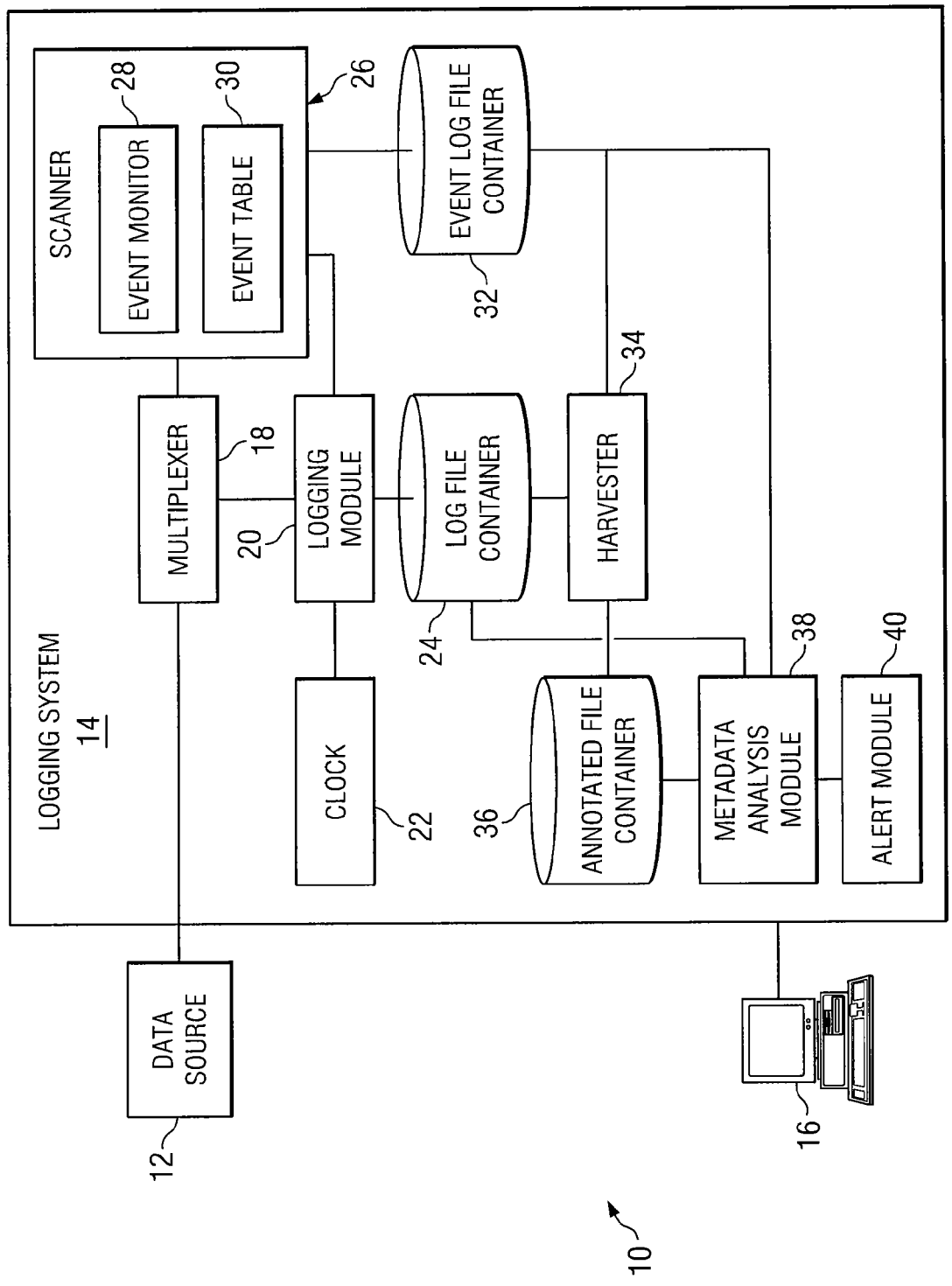
FIG. 1 is a block diagram illustrating an example system for log file time sequence stamping.

FIG. 1 is a block diagram illustrating example system 10 for log file time sequence stamping. In the illustrated example, system 10 includes one or more data sources 12, logging system 14, and user system 16. Logging system 14 may include a multiplexer 18, a logging module 20, a scanner 26, a harvester 34, and a metadata analysis module 38. Logging system 14 may also include data storage modules 24, 32, 36 for storage of various types of log files. User system 16 may include a graphical user interface (GUI). Although this particular implementation of system 10 is illustrated and primarily described, the present invention contemplates any suitable implementation of system 10 according to particular needs.

In particular embodiments, system 10 may provide a system for log file time sequence stamping. System 10 may add additional information to data received from data sources 12. In particular embodiments, system 10 adds an independent time stamp that reflects the time on system 10 when data is received from data sources 12. A large amount of data may be received from data sources 12 over a second, thus system 10 may add a sequence indicator to the data received from data sources 12. The sequence indicator reflects the order in which the data was received by system 10 during that second. The sequence indicator may reset after each independent time stamp. Additionally, system 10 may create individual log files for data sources 12 that include the independent time stamp and the sequence indicator.

In particular embodiments, data source 12 may be components, systems, and/or network elements that an information technology manager may be monitoring. Although generally referred to in the singular, any number of suitable components, systems, and/or network elements may be considered data source 12. These include computer systems that may be running on a MICROSOFT NET PLATFORM, APACHE SERVER, UNIX based operating systems, SUN MICROSYSTEMS JAVA PLATFORM, or any other suitable operating system. Other types of data source 12 include hardware based systems including switches, routers, storage arrays, environmental monitoring systems, medical devices, and any other type of device that is capable of transmitting a stream of data either autonomously or as a result of a request. Additionally, data source 12 may include applications such as a keystroke logger, login monitor, other software applications, or human interfaces that are a part of any system component. Data source 12 may include virtualized systems operating on large mainframe systems.

In particular embodiments, logging system 14 may include one or more general-purpose personal computers (PCs), Macintoshes, workstations, Unix-based computers, server computers, or any other suitable devices. In short, logging system 14 may include any suitable combination of software, firmware, hardware, and any other suitable components. Logging system 14 may include a single computing device or any suitable number of computing devices. For example, logging system 14 may include a number of computers arranged in a computing pool.

In particular embodiments, logging system 14 comprises several modules and storage devices. As described above, logging system 14 may contain, multiplexer 18, logging module 20, scanner 26, harvester 34, metadata analysis module 38, and data storage modules 24, 32, 36. Logging system 14 may be coupled to data source 12 by any appropriate means including, IP packets, Frame Relay frames, Asynchronous Transfer Mode (ATM) cells, voice, video, data, and other suitable information between network addresses and may include one or more local area networks (LANs), radio access networks (RANs), metropolitan area networks (MANs), wide area networks (WANs), all or a portion of the global computer network known as the Internet, and/or any other communication system or systems at one or more locations. Logging system 14 may be coupled to data source 12 via a console port. A console port may include a specific numerical network port accessed through a hardware network connector, a keyboard, video, monitor (KVM) connection, a serial or parallel port, and a numerical network port accessed through a wireless network connection.

In particular embodiments, user system 16 may be a computing system described with respect to logging system 14 and include one or more input/output devices that allow user to interface with logging system 14. In a particular embodiment, user system 16 includes a display device with a GUI that may allow a user to configure event table 30 with predefined patterns or data signatures for events, to configure how a notification is sent, and/or to interface with logging system 14. In some embodiments, GUI may include software that is able to obtain log files over a network and display and edit the log files. In a particular embodiment, user system 16 may connect to logging system 14 via an HTTP address and request information regarding log files, metadata fingerprints, and events.

In particular embodiments, multiplexer 18 may be a any suitable combination of logic encoded on a tangible computer-readable medium, hardware, or firmware. Multiplexer 18 is operable to receive data from data source 12 and any additional data source 12 that may be coupled to multiplexer 18 and combine the data from all data sources 12 into a single stream which is passed onto both scanner 26 and logging module 20.

Logging module 20 is operable to receive data from the multiplexer. Logging module 20 may be implemented via any suitable combination of hardware, logic encoded on a tangible computer-readable medium, or firmware. Coupled to logging module 20 may be clock 22. Logging module is operable to receive data from multiplexer 18, scanner 26, and access log file container 24. In particular embodiments, logging module 20 may access clock 22 to provide an independent time stamp to received data from multiplexer 18 and/or scanner 26. Additionally, logging module 20 may add a sequence indicator based on the order the data was received at logging module 20.

Logging module 20 may be operable to cause the storage of the received data in log file container 24 in the form of records. Individual records may be delineated using natural terminators from the data as carriage returns, punctuation marks, or specific symbols. Alternatively, records may be delineated according to a specific amount of data, for example, each record may be a maximum of 380 bytes long when not terminated by a natural terminator.

Log file container 24 may be hard disk drives, flash memory drives, storage server farms, and other forms of computer readable tangible storage media. Log file container 24 may be in the form of external or internal devices coupled to logging module 20 via any suitable communication link. Log file container 24 may be local to or remote from other components of system 10. Log file container 24 may store information received from multiplexer 18 for data source 12.

Scanner 26 may be any suitable combination of logic encoded on a tangible computer-readable medium, firmware, or hardware operable to receive data from multiplexer 18. Scanner contains event module 28 and event table 30. Scanner 26 may be operably coupled to event log file container 32. Scanner 26 may be operable to receive data from multiplexer 18.

Event module 28 and event table 30 may be implemented on logic encoded on a tangible computer-readable medium. Event log file container 32 may be implemented using the storage media described with respect to log file container 22. Event table 30 may contain event definitions. Event module 28 may be programmed to analyze the data received from multiplexer 18. Event module 28 may access event table 30 for event definitions in order to determine data patterns or keywords to detect that an event has occurred. Additionally, event module 28 may access clock 22 in order to provide time stamping for detected events. Event log file container 32 may store detected events from scanner 26. Scanner 26 may also be operably coupled to logging module 20. Data about detected events from scanner 26 may be transmitted to logging module 20 and stored by log file container 24. A time stamp from clock 22 or a sequence indicator may or may not be added to information stored in log file container 24.

Harvester 34 may be any suitable combination of logic encoded on a tangible computer-readable medium, firmware, or hardware operable to read and process data from log file container 24 and event log file container 32. Harvester 34 may also be operably coupled to annotated log file container 36. Annotated log file container 36 may be implemented using the storage media described with respect to log file container 22. Harvester 34 may be operable to determine whether the data in log file container 24 and event log file container 32 have changed. Harvester 34 may be user configurable to process data from a specific period of time from the log files. For example, harvester 34 may process data from a day ago, a week ago, or a month ago. Harvester may create annotated log files and store information in annotated log file container 36.

Metadata analysis module 38 may be any suitable combination of logic encoded on a tangible computer-readable medium, firmware, or hardware. Metadata analysis module 38 may be operably coupled to log file container 24, event log file container 32 and/or annotated log file container 36. Metadata analysis module 38 may be operable to create metadata fingerprints from the log files. Metadata analysis module 38 may analyze the metadata fingerprints to determine if the metadata fingerprint for a particular time period is within a specified tolerance of metadata fingerprints created for previous time periods. For example, metadata analysis module 38 may create a baseline metadata fingerprint. The baseline metadata fingerprint may be compared to a metadata fingerprint created using real time data received from data source 12. Metadata analysis module 38 may compare the baseline metadata fingerprint with the metadata fingerprint created using real time data to determine the variance between the two metadata fingerprints. The allowable variance, also referred to as tolerance, may be set to a number or percentage. For example tolerance may be set to allow variances of 2,500 bytes per second, 3 events per second, 10 records per second, or other value. Additionally, tolerance may be set to a number of standard deviations computed using statistical analysis of previous metadata fingerprints.

In particular embodiments, metadata analysis module 38 creates several types of metadata fingerprints. For example metadata analysis module may create a metadata fingerprint from a particular day's log file from log file container 24, event log file container 32, and/or annotated log file container 36. Metadata fingerprints are discussed in greater detail in relation to FIGS. 4A and 4B.

Metadata analysis module 38 may be coupled to alert module 40. Alert module 40 may be logic encoded on a tangible computer-readable medium, firmware, or hardware. Alert module 40 may comprise a web server or email server, which may or may not be part of a larger server system. Alert module 40 may be operable to receive alerts from metadata analysis module 38. Alert module 40 may transmit data to user system 16 regarding alerts and may cause user system 16 to display alerts. Alert module 40 may alternatively send an email to an information technology administrator that an alert has occurred or cause a popup window to appear on a web browser running on user system 16.

Logging system 14 and user system 16 may be part of the same system or operably coupled via any suitable communication link, such as ethernet or 802.11 networking. Additionally, although various components of logging system 14 are illustrated and described separately, the present disclosure contemplates combining these components or further separating these components.

In operation of system 10, data source 12 may be operably coupled to logging system 14 via a console port. Logging system 14 receives data from data source 12. The data may be text displayed on a monitor attached to data source 12, error messages generated by data source 12, or any other type of data output. Multiplexer 18 receives the data and passes the data to logging module 20 and scanner 26.

Logging module 20 accesses clock 22 and time stamps the data with a sequence indicator before storing the time stamped data in log file container 24. Scanner 26 processes the data by analyzing for events using event monitor 28 and event table 30. If an event is found, scanner creates an event entry and accesses clock 22 to time stamp the event entry. The event entry is stored in event log file container 32. The event may also be stored in log file container 24. Logging module 20 and scanner 26 may process the same data at substantially the same time.

Harvester 34 determines if data from log file container 24 and/or event log file container 32 have changed. Harvester 34 also creates entries in annotated log file container 36. Examples of entries harvester 34 may create in annotated log file container 36 include, metadata information such as, records recorded to a particular point in time, events recorded at a particular point in time, and a location of events in log file container 24 that correspond with locations in event log file container 32. This annotation may provide for cross-references for entries between log files. Metadata analysis module 38 creates metadata fingerprints and analyzes the fingerprints for deviations from acceptable tolerances. If a deviation is found, metadata analysis module generates a notification that a deviation has occurred. Metadata analysis module 38 also generates entries in annotated log file container 36 that relate the deviation to locations in log file container 24 and event log file container 32, which will be discussed in further detail with regard to FIG. 4B. Alert module 40 receives notification that a deviation has occurred. Alert module 40 sends an alert to user system 16. The alert may contain information relating to the deviation as well as possible options for remediation or allow the alert to be cancelled.

Figure 3:
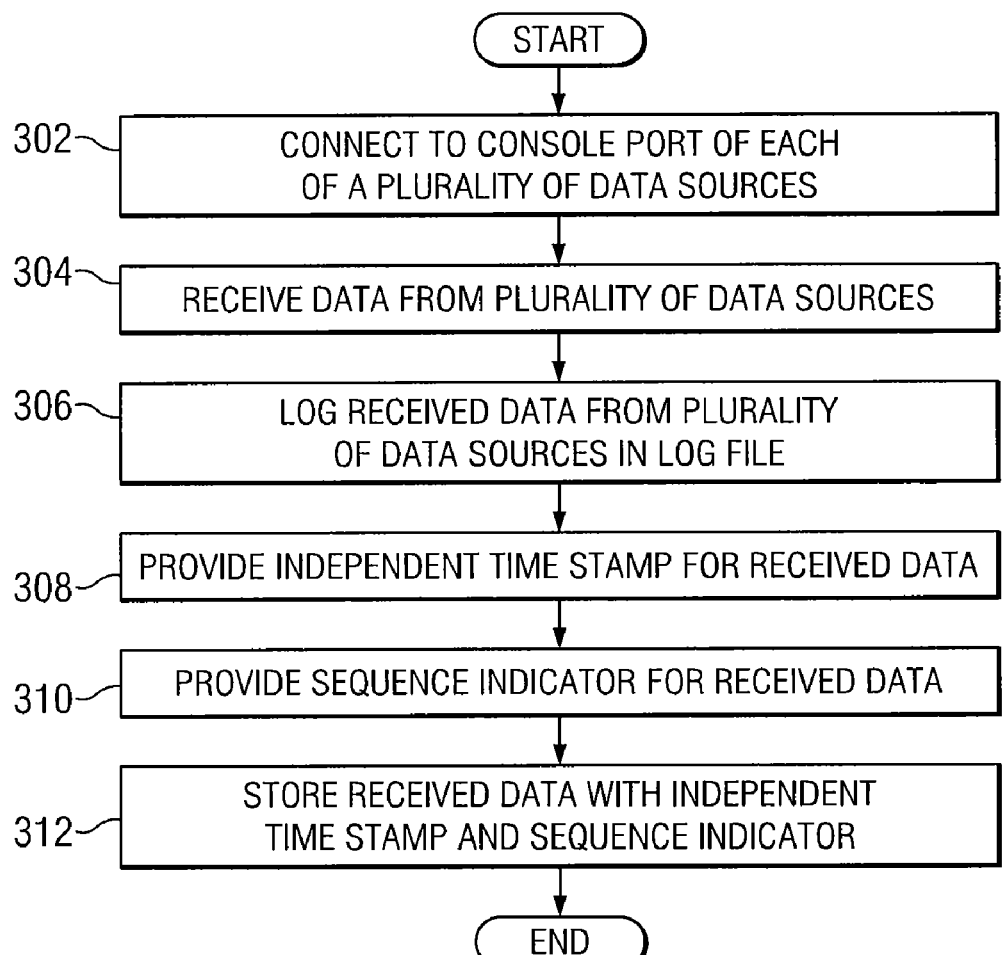
FIG. 3 is a flowchart illustrating an example method for log file time sequence stamping.
Figure 4B:
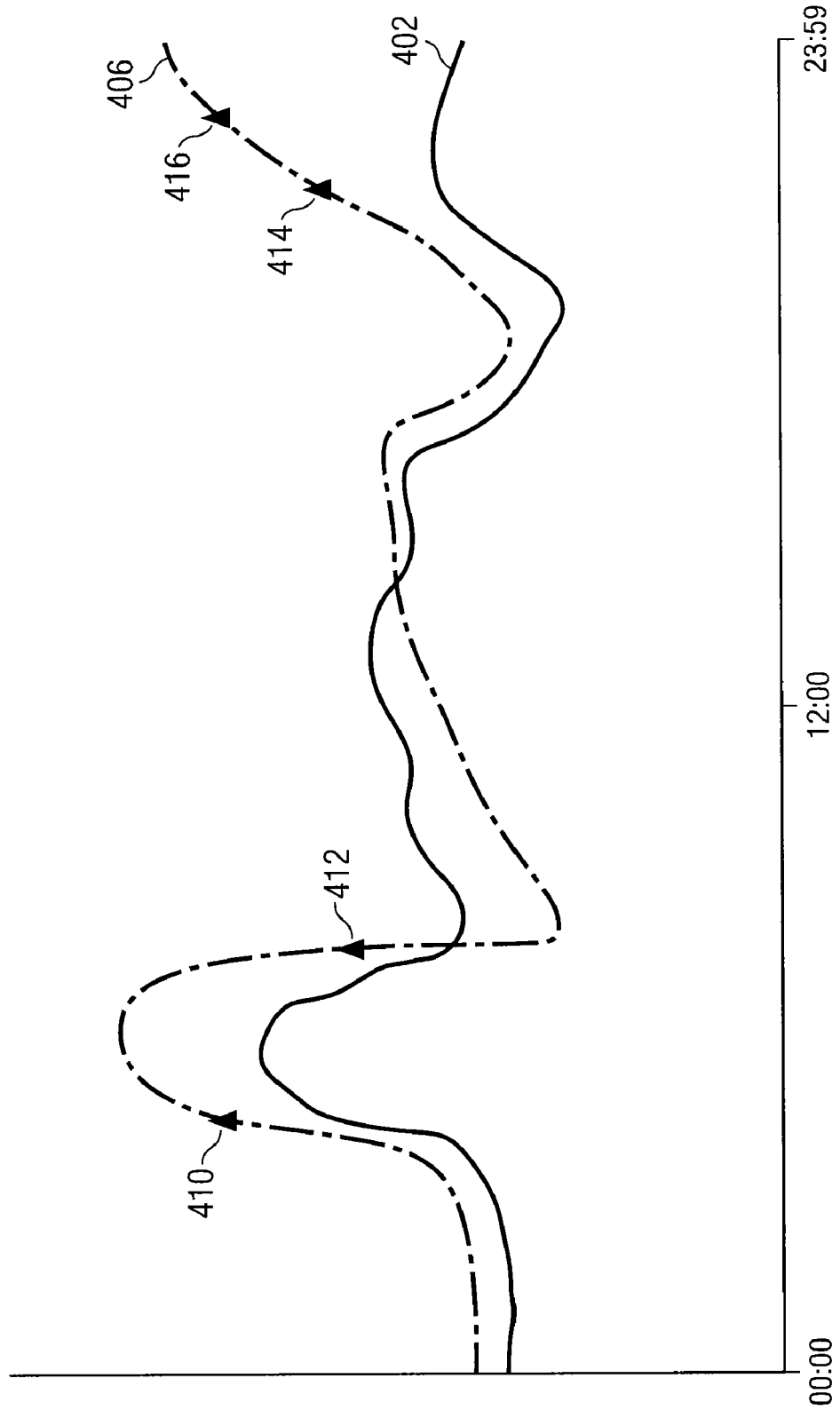
FIG. 4B is a graph illustrating particular points of interest from metadata fingerprints baseline and Tuesday from FIG. 4A.
Figure 5:
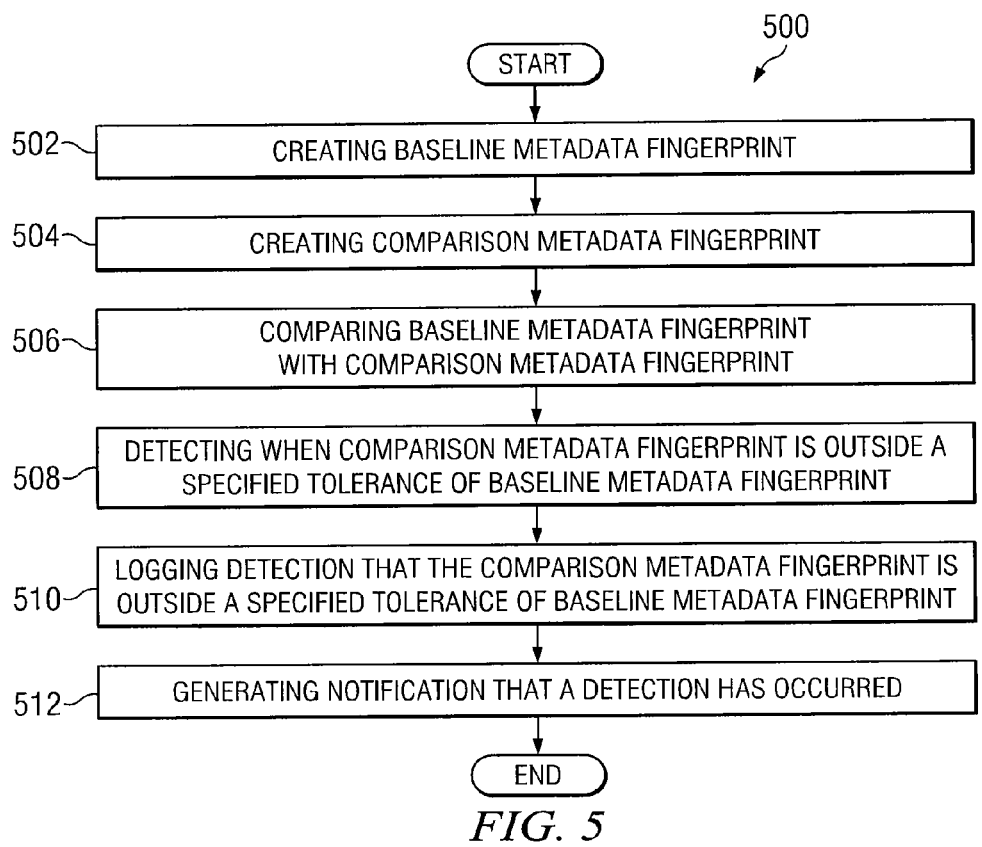
FIG. 5 is a flowchart illustrating an example method that may be carried out by the metadata analysis module in creating and analyzing metadata fingerprints.
Figure 6:
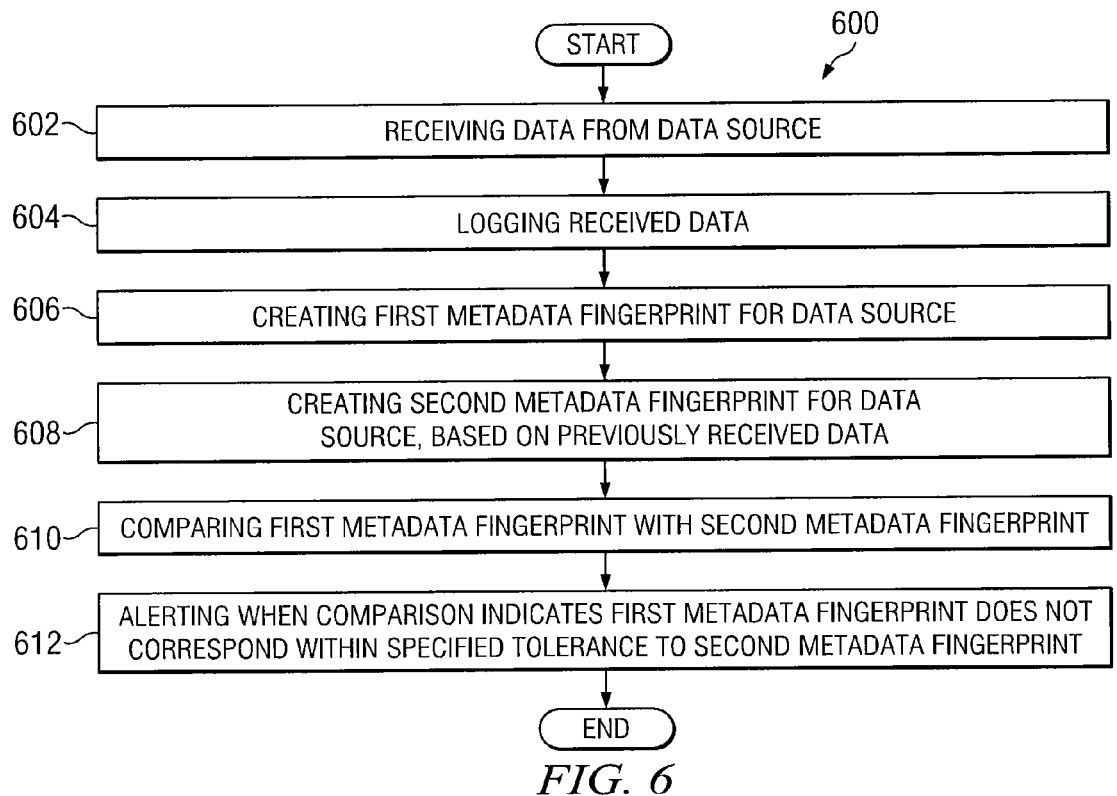
FIG. 6 is a flowchart illustrating an example method for using metadata analysis for monitoring, alerting, and remediation.

As can be understood with respect to system 10, an embodiment of the invention provides a system log file time sequence stamping of data sources, such as firewalls, computer systems, routers, and storage arrays. The following figures may provide greater insight to those of ordinary skill in the art as to other embodiments of the invention. FIGS. 2A, 2B, 2C, and 2D illustrate example log files that logging system 14 may generate. These example log files provide a greater understanding of how certain embodiments of the invention may store the received data and associate it with an independent time stamp with a sequence indicator. FIG. 3 illustrates an example flowchart of using log file time sequence stamping. FIGS. 4A and 4B illustrate a graphical representation of metadata fingerprints. These graphs provide greater detail about how a particular embodiment of system 10 may analyze the metadata fingerprints. FIG. 5 provides a flowchart illustrating an example method that metadata analysis module 38 may use to create and analyze the metadata fingerprints of FIGS. 4A and 4B. FIG. 6 provides a flowchart illustrating an example method for using metadata analysis for monitoring, alerting, and remediation of systems.

FIG. 2A is a table 200 illustrating example time sequence stamping of log file entries. Table 200 illustrates sample entries in a log file during the course of a day. In this example, columns 202-208 represent categories of information stored by log files. Rows 210-230 represent individual log entries in the log file.

Column 202 is an independent time stamp provided by clock 22 when data from multiplexer 18 was received by logging module 20. Column 204 is a sequence indicator appended to the data received by logging module 20. The sequence indicator may be a number or letters or any suitable way to indicate an ordering of the data received. For example, the sequence indicator can be numbers and start at 1. Alternatively, the sequence indicator could use letters A, B, C and so on. The sequence indicator could reset at the beginning of each new second. For example, at each new second of the independent time stamp, the first entry will always be the number 1 or the letter A. Column 206 lists the system from which the data was received. In this example, there are three systems that have data stored in the log file, server1, firewall, and router. Although only three systems are illustrated, any number of systems may be used according to particular needs. Additionally, although the systems are named generically, any suitable name may be used for identification. Column 208 is the data received by logging module 20. In certain embodiments, a column may be added to provide an independent date as well.

Row 210 is the first entry for data received at logging module 20 at time 10:23:01 as kept by clock 22. It is given a sequence number of 1. The system from which the data originated is server1. The data shows that at 21:32:51, server1 time, a login request was made for the username "admin" and a password of CAX1348Y. Row 212 is the second entry for data received at logging module 20 at time 10:23:01. This entry is given a sequence number of 2 to indicate that it is the second entry received at time 10:23:01. The data for entry for row 212 originated from firewall reporting an intrusion attempt at 15:23:46 firewall time, from IP address 134.146.72.81. Rows 214, 216, 218 illustrate additional data received at logging module 20 at time 10:23:01. For example, row 214 illustrates that router was unable to access the IP address 255.255.1.2. Row 216 shows that firewall detected a second intrusion attempt that same second from address 142.167.85.214. Finally row 218 illustrates that server1 has verified the login attempt recorded in row 210.

Rows 220-224 illustrate events recorded by logging module 20 at time 10:23:02 as kept by clock 22. The first entry, row 220, is given sequence number 1 as a new second has occurred according to the time kept by clock 22. Row 220, the second entry at time 10:23:02, is given sequence number 2 and contains data from server1 indicating that the user "admin" has logged into server1 at 21:32:52 on server1's clock. Row 222 illustrates that router has attempted to "ping" IP address 255.255.1.2. Row 224 illustrates that server 1 at 21:32:53 on its clock is starting the process "user update."

Rows 226-230 illustrate the log file at a later point in time. For example, row 226 indicates that server1 logged out the user "admin" is given sequence number 1. Row 228 is another data message received by logging module 20 from server1. This data message reports that server1 is idle. Row 230 is the third data message received by logging module 20 for time 11:34:31. The entry for row 230 is given a sequence number of 3 and shows that firewall allowed traffic from IP address 178.216.15.72.

Most systems, such as the illustrated server1, firewall, and router, will transmit a time of when the data was sent by the system. The time generally is the system time as set on the system that sent the data. This time may or may not be an accurate time. For example, the independent time stamp reflected in column 202 for 10:23:01, shows that server1 has a time of 21:32:51, firewall has a time of 15:23:46 and that router has a time 19:15:32 as shown by rows 210, 212, and 214 respectively. The different times may be for a number of reasons, including being located in a different time zone, a failure to configure the time on a system, or a failure to properly synchronize each system to the other systems in the network. A particular advantage of providing an independent time stamp is to have a single consistent time as a reference point for when log entries were received. A further advantage is provided in that it is often difficult to properly synchronize each system and keep the systems synchronized. Each data source's clock, even when properly synchronized, may, over time, lose or gain seconds as compared to other clocks. Additionally, internal clocks of data source 12 may not be accurate. Thus, using the time stamp from the internal clock of data source 12 may lead to erroneous results in an attempt to reconstruct an order of events leading to a system failure or intrusion.

FIGS. 2B, 2C, and 2D illustrate example individual log files for data source 12. FIG. 2B is an example of a log file generated form the combined log file of FIG. 2A for system server1. FIGS. 2C and 2D are example log files generated for systems firewall and router respectively. Although similar to FIG. 2A, FIGS. 2B, 2C, and 2D store slightly different data than the log file of FIG. 2A. For example, column 206, which designates the system that the data was received is missing in FIGS. 2B, 2C, and 2D.

For example, it may be helpful to see only the log entries for system server1. FIG. 2B illustrates such an log file. Logging system 14, may create individual log files for display on user system 16. The individual log files may analyze column 206 in order to determine whether to include a particular entry log entry from the master log file of FIG. 2A. Rows, 210, 218, 220, 224, 226, 228 are associated with server1. Logging system 14 creates a log file for server1 that includes column 232 indicating the independent time stamp, column 234 indicating the sequence number, and column 236 containing the data for the particular log entry. Each row represents an individual log entry from FIG. 2A for server1. In particular, the sequence number may be helpful to show that other data was received in the interim. Further, each row may be linked via metadata or other annotation to the log file of FIG. 2A. This may provide an advantage to a user who is trying to analyze events leading to the failure of a particular system or the mode of entry in an intrusion attempt. The ability to move from a particular log entry of notice in a particular system to the data received from other systems is useful to better understand what may have happened to cause the particular entry to occur. FIGS. 2C and 2D are further examples of individual system log file entries for data sources firewall and router from FIG. 2A.

FIG. 3 is a flowchart illustrating an example method for log file time sequence stamping. At step 302, a connection is made to the console port of each of a plurality of data sources 12. The connection may be a persistent and/or direct connection to the console port. At step 304, data is received from the plurality of data sources 12. At step 306 the received data is logged from the plurality of data sources in a log file. The log file may be stored in log file container 24. At step 308 an independent time stamp is provided for the received data. The independent time stamp may reflect the time on clock 22 at the moment the data was received at logging module 20. At step 310 a sequence indicator is provided for the received data. The sequence indicator may be a number or letters or any suitable way to indicate an ordering of the data received. For example, the sequence indicator can be numbers and start at 1. Alternatively, the sequence indicator could use letters A, B, C, and so on. The sequence indicator could reset at the beginning of each new second. For example, at each new second of the independent time stamp, the first entry will always be the number 1 or the letter A. Steps 306, 308 and 310 may be performed substantially contemporaneously in any order. At step 312 the received data with the independent time stamp and sequence indicator is stored in log file 24.

FIG. 4A is a graph 400 illustrating example metadata fingerprints generated by an example of logging system 14. These metadata fingerprints provide an example of a pictorial representation of the metadata received by logging system 14. In this example, graph 400 illustrates a metadata fingerprint for four periods of 24 hours. Individual fingerprint graphs 402, 404, 406, and 408 represent a metadata fingerprint generated for a particular 24 hour period.

Horizontal axis of graph 400 may represent any particular period of time. For example, particular periods of time may be an hour, 12 hours, a day, a week, or a month. The vertical axis of graph 400 may represent metadata information about data stored in log file container 24, event log file container 32, and/or annotated log file container 36. Examples of the metadata information may be events per unit time, records per unit time, and/or bytes per unit time.

In the illustrated example for graph 400, the horizontal axis represents time from 00:00 (midnight) to 23:59 (one minute before midnight) for a given day. Fingerprint graph 402 represents a baseline metadata fingerprint. Individual fingerprint graphs 404, 406, and 408 represent a metadata fingerprint for Monday, Tuesday, and Saturday respectively. For simplicity, graph 202 will be referred to as baseline 402, graph 404 as Monday 404, graph 406 as Tuesday 406, and graph 408 as Saturday 408.

Baseline 402 represents a metadata fingerprint that logging system 14 may use as the basis of comparison to other metadata fingerprints. For example, Monday 404 metadata fingerprint may represent a metadata fingerprint of events per second received form a physical machine on a Monday. Baseline 402 may represent a metadata fingerprint of events per second received from the same physical machine averaged over the last week's weekdays.

Metadata analysis module 38 determines that a tolerance level of 5% is an acceptable variance based on the standard deviation of the previous Monday's data. Although metadata fingerprint Monday 404 does not correspond exactly to baseline 402, metadata analysis module 38 determines that the variance at all times is within the 5% acceptable range. Accordingly metadata analysis module 38 does not create an alert.

Tuesday 406 may represent a metadata fingerprint for Tuesday of the same week. Metadata analysis module 38 may use baseline 402 and tolerance level of 5% for Tuesday 406 in metadata analysis module's 38 analysis. In this example, metadata analysis module 38 determines that at 08:00 (about ⅔ between 00:00 and 12:00) and 21:00 (¾ between 12:00 and 23:59), the variance between baseline 402 and Tuesday 406 exceeds the acceptable variance and generates an alert at both 8:00 and 21:00.

Saturday 408 may represent a metadata fingerprint for Saturday of the same week. It should be apparent from the graph that the fingerprint for Saturday 408 is significantly different than the metadata fingerprint for other days of the week as well as baseline 402. Metadata analysis module 38 may be programmed to respond to this in several ways. In a particular embodiment, metadata analysis module 38 may be programmed to ignore metadata fingerprints for weekend days. In other embodiments, metadata analysis module 38 may compare Saturday 408 to baseline 402. In this particular embodiment, an alert may be generated at 8:00 through 18:00 and again at 21:00 through 23:59. In yet another embodiment, metadata analysis module 38 may compare Saturday 408 to a Saturday baseline (not illustrated) that is generated using the metadata fingerprints from the four previous Saturdays.

FIG. 4B is a graph illustrating particular points of interest from metadata fingerprints baseline 402 and Tuesday 406 from FIG. 2A. For example, points 410, 412, 414, and 416 may represent points of interest where metadata analysis module 38 may have created an alert or cancelled an alert.

As previously discussed, the metadata fingerprint Tuesday 406 had unacceptable variances at 8:00 and 21:00. The detection of an unacceptable variance is at point 410. At point 410, metadata analysis module 38 determines that the variance between Tuesday 406 and baseline 402 has exceeded the allowable range and an alert is created. The alert may be logged by annotated log file container 36, with information that references locations within log file container 24 and event log file container 32. An event may also be recorded in event log file container 32. Alert module 40 may also create an alert notification on user system 16.

At point 412, metadata analysis module 38 determines that the variance between Tuesday 406 and baseline 402 is now within the allowable tolerance range. Metadata analysis module 38 may notify alert module 40 that the variance has returned to the allowable range. Additionally, metadata analysis module 38 may record an entry in event log file container 32 that indicates the variance has returned to acceptable levels. Alert module 40 may cause the previously created alert notification on user system 16 to be cancelled or add additional information to the previously created alert that the variance has returned to acceptable levels.

At point 414, metadata analysis module 38 again determines that the variance between Tuesday 406 and baseline 402 has exceeded the allowable range. As with point 410, the same steps that metadata analysis module 38 preformed may occur. At point 416, an information technology administrator may have responded to the alert generated by alert module 40. The information technology administrator may use user system 16 to clear the alert and cancel subsequent alerting for a set period of time or until a new variance is detected after the variance returns to acceptable levels.

FIG. 5 is a flowchart illustrating an example method that may be carried out by metadata analysis module 38 in creating and analyzing metadata fingerprints. In the illustrated embodiment, at step 502, a baseline metadata fingerprint is created. At step 504, a comparison metadata fingerprint is created. An analysis between the baseline metadata fingerprint and comparison metadata fingerprint is made at step 506. At step 508, detection of when the baseline metadata fingerprint and comparison metadata fingerprint is outside a specified tolerance is performed. At step 510, the detection that the comparison metadata fingerprint has been detected to be outside a specified tolerance is logged. At step 512, a notification is generated that a detection that the comparison metadata fingerprint has been detected to be outside a specified tolerance. In particular embodiments, method 500 may be performed continuously to provide real time monitoring of data source 12.

In a particular embodiment, at step 502, metadata analysis module 38 may access log file container 24 and/or event log file container 32 to create a baseline metadata fingerprint. Metadata analysis module 38 may be configured to create metadata fingerprints for particular periods of time. For example, metadata fingerprints may be created for a hour, a day, a week, and/or a month. Metadata analysis module 38 may also create metadata fingerprints for specific ranges or days. For example, specific ranges may be 10-20 days ago, the previous five Saturdays, the previous 10 work days.

Metadata analysis module 38 may also create fingerprints according to various criteria. For example metadata fingerprints may be created according to the number of bytes received per second, a number of records created per minute, the number of events recorded per hour, or other suitable criteria. The baseline fingerprint may use time on the horizontal axis and the criteria on the vertical axis. Additionally, a metadata fingerprint may be created according to a running total of the number of bytes, records, and/or events received up to a particular time of day. For example, at time 00:00 for a particular day, the number of bytes received is set to 0. At 05:00, the total number of bytes received since 00:00 is 10,000; at 10:00 the total number of bytes received since 00:00 may be 50,000.

At step 504, a comparison metadata fingerprint is created. This comparison metadata fingerprint may be created from real time data received from data source 12 for that particular day or for a specific period of time. The comparison metadata fingerprint may use the same axes as the baseline metadata fingerprint. For example, comparison metadata fingerprint may be created as from a real time running tally of bytes received since 00:00. Alternatively, comparison metadata fingerprint may be created from the generated data from a virtual machine over the course of several days or weeks.

At step 506, an analysis is performed between baseline metadata fingerprint and comparison metadata fingerprint. For example, baseline metadata fingerprint may represent the average of several weeks worth of data from a physical machine. Comparison metadata fingerprint may represent the data for a particular day from a virtual machine that is configured to replace the physical machine. In a particular embodiment, baseline metadata fingerprint may be from a first virtual machine and comparison metadata fingerprint may be from a second virtual machine configured to be identical to the first virtual machine.

In a particular embodiment, baseline metadata fingerprint may represent the average of several weeks worth of data from a particular data source for a particular time period. Comparison metadata fingerprint may be generated from real time data from the particular data source for the same time period. For example, baseline metadata fingerprint may be the average number of events per minute logged from the particular data source from 00:00 to 12:00 over the course of the past three weeks. Comparison metadata fingerprint may be the number of events per minute logged from 00:00 to the current time, 12:00, on the particular day method 500 is performed for that particular data source.

At step 508, detection of when the baseline metadata fingerprint and comparison metadata fingerprint is outside a specified tolerance is performed. For example, the specified tolerance may be a set percentage, such as 5%, 10% or 15% above or below the baseline metadata fingerprint. Alternatively, a statistical analysis may be performed if the baseline metadata fingerprint is generated using an average of previous data. The statistical analysis may provide a standard deviation based on the previous data and the specified tolerance may be a number of multiples of the standard deviation, including 1×, 2×, 1.5×, or other multiple.

In a particular embodiment, the tolerance is set to 10%. The value of the baseline metadata fingerprint is 100 events per second. The comparison metadata fingerprint's value at the same instance is 120 events per second. The difference between the value of baseline metadata fingerprint and comparison metadata fingerprint is greater than 10% and a log entry may be created. In another embodiment, the tolerance may be set to 2× the standard deviation. The difference between baseline metadata fingerprint and comparison metadata fingerprint is 1× the standard deviation. No log entry would be generated in such a circumstance.

At step 510, logging that a detection that the comparison metadata fingerprint is outside a specified tolerance of baseline metadata fingerprint is performed. In particular embodiments, metadata analysis module 38 may cause an entry to be created in annotated log file container 36. The entry may indicate the locations in log file container 24 and/or event log file container 32 that correspond to the location in the comparison metadata fingerprint where the detection that the value was outside a specified tolerance occurred. For example, the comparison metadata fingerprint may have a 20% deviation from the baseline metadata fingerprint at 08:00. An entry in annotated log file container 36 may record the line numbers of entries in log file container 24 and/or event log file container 32 that have a time stamp of 08:00.

At step 512, a notification that a detection that the comparison metadata fingerprint is outside a specified tolerance range of the baseline metadata fingerprint has occurred is generated. This notification may be transmitted to alert module 40, which may in turn cause an alert to appear on user system 16. Alternatively alert module 40 may send an email to specific addresses notifying the recipients that a detection has occurred.

FIG. 6 is a flowchart illustrating an example method 600 for using metadata analysis for monitoring, alerting, and remediation. At step 602, data is received from a data source. The data is logged at step 604. A first metadata fingerprint is created from the data source at step 606. A second metadata fingerprint is created using previously received data from a data source at step 608. In certain embodiments, the data for the second metadata fingerprint may be from the same data source. In certain embodiments, data for the second metadata fingerprint may be from a physical or first virtual machine where the first metadata fingerprint is from a second virtual machine that is replacing the physical or first virtual machine.

At step 610 the first and second metadata fingerprints are analyzed. In certain embodiments, the first and second metadata fingerprints are compared such that an alert is generated when the values for any given period of time are outside a specified tolerance range. At step 612, an alert is sent when the values for any given period of time are outside a specified tolerance range.

In a particular embodiment, method 600 may be used to verify a successful virtualization of a physical machine to a virtual machine. Data source 12 may be a physical computer system. Metadata fingerprints may be created on the data received from data source 12. A company decides to use a virtual version of the physical computer system. A particular problem is how to determine whether the virtualization of the computer was done successfully, that is, whether the virtual computer system functions identically to the physical machine. It is expected that if virtualization was successful, metadata fingerprints of the virtual machine will be within tolerances of the metadata fingerprints of the physical machine. Method 600 may be used to detect and remediate problems with virtualization.

In particular embodiments, method 600 may be used to verify and allow uninterrupted monitoring of a virtual machine to another virtual machine. A virtual machine may be a system that services web pages. For example, a company may desire a backup system in the event that a main system is required to be shut down for maintenance or otherwise. This may be commonly referred to as a hot or warm backup system. It is often desired that the backup system operate exactly the same as the main system. Method 600 may also be used in conjunction with virtualizing a physical system to determine if the virtual machine operates similarly to the physical machine. Additionally, logging system 14 may detect that a hypervisor transfer occurred from the a virtual machine to a backup virtual machine. Logging system 14 may cause the log files associated with the first virtual machine to be concatenated with the log files generated by the data received from the backup virtual machine. A particular advantage of this embodiment is the log files and metadata fingerprints generated from the log files will not show an interruption despite moving from an initial system to a backup system. The virtual machines will be treated as one device despite moving from one instantiation to another.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
connecting, by a computing system, to a console port of each of a plurality of data sources and receiving data from the console port of each of the plurality of data sources; and
logging, by a computing system, the received data from the plurality of data sources in a plurality of log entries in a log file, each log entry comprising an independent time stamp, wherein:
the sequence indicator represents an order in which log entries having the same time stamps were received, the sequence indicator being reset to an initial value for each new log entry having a particular independent time stamp that is later in time than an independent time stamp of a log entry immediately preceding the new log entry in the log file;
creating individual log files for each of the plurality of data sources; and
the independent time stamp provides a consistent time stamp of when the data was received from each of the plurality of data sources.

2. The method of claim 1, further comprising:
storing the log entries by time stamp and then sequence indicator for the individual log files for each of the plurality of data sources.

3. The method of claim 1, further comprising:
connecting to a network port of some of the plurality of data sources and receiving data from the network port; and
logging the received data from the network port with the independent time stamp and sequence indicator.

4. The method of claim 1, further comprising:
logging metadata for the particular log files.

5. The method of claim 1, further comprising:
providing a graphical user interface to display the log file.

6. Software embodied in a non-transitory computer-readable medium and when executed operable to perform operations, comprising:
connecting to a console port of each of a plurality of data sources and receiving data from the console port of each of the plurality of data sources; and
logging the received data from the plurality of data sources in a plurality of log entries in a log file, each log entry comprising an independent time stamp and a sequence indicator, wherein:
the sequence indicator represents an order in which log entries having the same time stamps were received, the sequence indicator being reset to an initial value for each new log entry having a particular independent time stamp that is later in time than an independent time stamp of a log entry immediately preceding the new log entry in the log file;
creating individual log files for each of the plurality of data sources; and
the independent time stamp provides a consistent time stamp of when the data was received from each of the plurality of data sources.

7. The software of claim 6, further comprising:
storing the log entries by time stamp and then sequence indicator for the individual log files for each of the plurality of data sources.

8. The software of claim 6, further comprising:
connecting to a network port of some of the plurality of data sources and receiving data from the network port; and
logging the received data from the network port with the independent time stamp and sequence indicator.

9. The software of claim 6, further comprising:
logging metadata for the particular log files.

10. The software of claim 6, further comprising:
providing a graphical user interface to display the log file.

11. a system, comprising:
one or more processing units operable to:
connect to a console port of each of a plurality of data sources and receiving data from the console port of each of the plurality of data sources; and
log the received data from the plurality of data sources in a plurality of log entries in a log file, each log entry comprising an independent time stamp and a sequence indicator, wherein:
the sequence indicator represents an order in which log entries having the same time stamps were received, the sequence indicator being reset to an initial value for each new log entry having a particular independent time stamp that is later in time than an independent time stamp of a log entry immediately preceding the new log entry in the log file;
creating individual log files for each of the plurality of data sources; and
the independent time stamp provides a consistent time stamp of when the data was received from each of the plurality of data sources.

12. The system of claim 11, further discloses further comprising:
store the log entries by time stamp and then sequence indicator for the individual log files for each of the plurality of data sources.

13. The system of claim 11, further comprising:
connect to a network port of some of the plurality of data sources and receiving data from the network port; and
log the received data from the network port with the independent time stamp and sequence indicator.

14. The system of claim 11, further comprising:
log metadata for the particular log files.

15. The system of claim 11, further comprising:
provide a graphical user interface to display the log file.

16. The method of claim 1, wherein connecting to the console port of each of the plurality of data sources comprises establishing a persistent connection to the console port of each of the plurality of data sources.

17. The software of claim 6, wherein connecting to the console port of each of the plurality of data sources comprises establishing a persistent connection to the console port of each of the plurality of data sources.

18. The system of claim 11, wherein connecting to the console port of each of the plurality of data sources comprises establishing a persistent connection to the console port of each of the plurality of data sources.

* * * * *